Jan. 19, 1932.   W. HULSEBOS   1,842,322

SWASH PLATE MECHANISM

Filed July 30, 1930

INVENTOR
W. HULSEBOS

Patented Jan. 19, 1932

1,842,322

UNITED STATES PATENT OFFICE

WICHERT HULSEBOS, OF LAREN, NETHERLANDS

SWASH PLATE MECHANISM

Application filed July 30, 1930, Serial No. 471,749, and in the Netherlands August 27, 1929.

This invention relates to swash plate mechanism applicable to engines having cylinders parallel to the crank shaft for transmitting the movement of the piston to a wabbler or swash plate or vice versa.

In such engines the pressure of each piston must be transmitted to the wabbler at a point which describes on a spherical surface a path in the form of an elongated loop (lemniscate). For effecting such transmission there has not been available heretofore a suitable mechanism.

In the construction according to the invention the rectilinearly guided piston rod is in fixed connection with two plane bearing surfaces facing one another, in the interspace between which surfaces the wabbler projects. The latter has two preferably spherical or conical bearing surfaces facing the bearing surfaces presented by the piston rod. Between each bearing surface of the wabbler and the corresponding bearing surface of the piston rod is a sliding shoe or slipper having parallel plane faces and having a ball and socket connection with the wabbler, so that the shoe may slide over the corresponding bearing surface of the piston rod.

Figure 1:
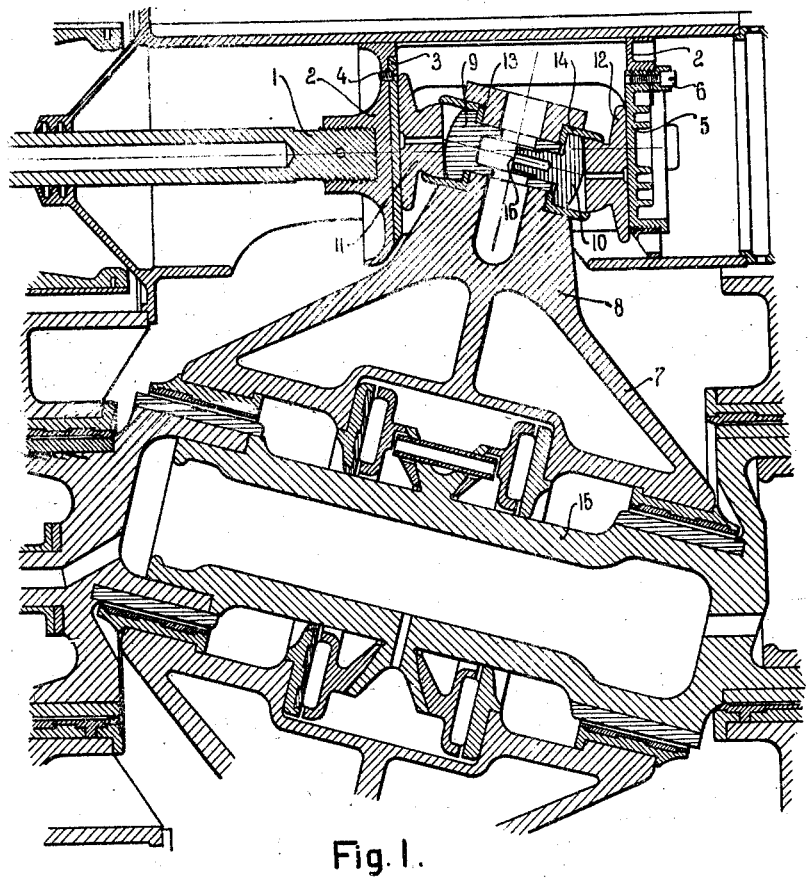
Figure 2:
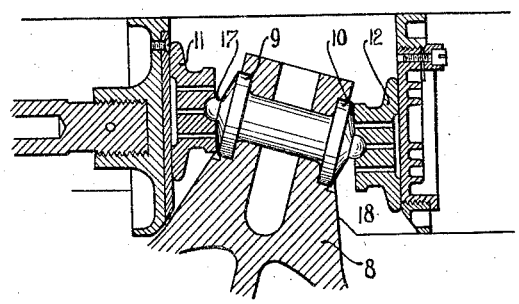

Figs. 1 and 2 of the accompanying drawings show in section two embodiments of the invention.

Referring to Fig. 1:—

Screwed on the end of the piston rod 1 is a boxlike structure 2 in which is secured by screws 4 a plate 3 having a plane bearing surface, and into which is threaded a similar plate 5. The plate 5 is adjustable in axial direction and can be secured by means of a screw 6 traversing a saw cut in said plate. The wabbler 7 has a portion 8 projecting into the boxlike structure 2 and is provided with two thrust members 9 and 10 each having a spherical external bearing surface. Between the member 9 and the bearing plate 3 is a sliding shoe or slipper 11 bounded at both sides by plane faces. The sliding shoe 11 has a ball and socket connection with the wabbler, the socket 13 being common to a spherical projection of the shoe 11 and to the member 9, so that the shoe must follow the movements of the member 9. Between the members 10 and 5 there is interposed a similar sliding shoe 12 having a ball and socket connection with the wabbler, the socket being indicated at 14.

In operation, the wabbler performs a composite movement. Its axis which is also the axis of the inclined crank 15 generates a conical surface about the point of intersection of said axis with the axis of the shaft, that is, about the centre of the wabbler. The axis of the parts 9 and 10 remains parallel to that of the wabbler 7 or to the inclined crank 15 and consequently likewise performs a conical movement, independent of the movement of the apex 16 of the cone, i. e., the said axis forms a constant angle with a plane perpendicular to the axis of the piston rod and therefore with the sliding face of the shoe 11. As this shoe follows the movement of the thrust member 9, the spherical surface of this thrust member rolls on the bearing surface presented by the shoe 11 in a circular path about the centre of said surface.

As the two circles on which the parts 9 and 11 contact with one another do not have the same radius, a true rolling motion does not take place. Whether now the thrust member 9 is to slide over the shoe 11 or whether the latter is to turn depends on the frictional resistance between the parts 11 and 3. The same is true of the relations between the part 12 and the parts 10 and 5.

In view of the above explanation Fig. 2 does not require to be described in detail. In this case the thrust members 9 and 10 have conical end faces and are each provided with a spherical projection 17 or 18 located in a corresponding spherical depression in the shoe 11 or 12 making a ball and socket connection therewith.

The advantage of the described construction as compared with known constructions is to be recognized in the feature that the bearing surfaces which transmit the piston thrust to the wabbler are perpendicular to the axis of the piston rod, so that no forces oblique to the said axis are set up.

As the sliding member 12 has not to transmit any large forces, it may be dispensed with. In this case the thrust member 10, which will be suitably constructed, is in direct contact with the bearing surface 5. Instead of being bounded by spherical surfaces the parts of the universal joint 11, 13 (or 17) or 12, 14 (or 18) may be bounded by conical surfaces in which case they are in linear contact only.

What I claim is:—

1. Mechanism for transmitting movement between a piston and a wabbler in engines having cylinders arranged parallel to the crank shaft consisting in slipper members having sliding cooperation with the piston and having plane surfaces, and thrust members carried by the wabbler having curved surfaces to engage the plane surfaces of the slipper members.

2. Mechanism for transmitting movement between a piston and a wabbler in engines having cylinders arranged parallel to the crank shaft consisting in slipper members having sliding cooperation with the piston and having plane surfaces, thrust members carried by the wabbler having curved surfaces to engage the plane surfaces of the slipper members, and a ball and socket connection between the wabbler and slipper members.

In testimony whereof I affix my signature.

WICHERT HULSEBOS.